US008977605B2

(12) United States Patent
Kantak et al.

(10) Patent No.: US 8,977,605 B2
(45) Date of Patent: Mar. 10, 2015

(54) STRUCTURED MATCH IN A DIRECTORY SPONSORED SEARCH SYSTEM

(75) Inventors: Darshan Vishwanath Kantak, Pasadena, CA (US); Raghavendra Donamukkala, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1137 days.

(21) Appl. No.: 11/511,570

(22) Filed: Aug. 28, 2006

(65) Prior Publication Data
US 2008/0052275 A1 Feb. 28, 2008

(51) Int. Cl.
*G06F 7/00* (2006.01)
*G06F 17/30* (2006.01)

(52) U.S. Cl.
CPC .... *G06F 17/30864* (2013.01); *G06F 17/30663* (2013.01)
USPC ......................................................... 707/706

(58) Field of Classification Search
USPC ...................................................... 707/3, 706
See application file for complete search history.

(56) References Cited

U.S. PATENT DOCUMENTS

| | | | | |
|---|---|---|---|---|
| 5,995,921 | A * | 11/1999 | Richards et al. | 704/9 |
| 6,269,361 | B1 | 7/2001 | Davis et al. | 707/3 |
| 6,471,521 | B1 | 10/2002 | Dornbush et al. | 434/322 |
| 7,197,478 | B2 * | 3/2007 | Kargman | 705/26 |
| 7,210,094 | B2 * | 4/2007 | Dovin et al. | 715/240 |
| 7,328,215 | B2 * | 2/2008 | Stumpf | 707/100 |
| 2001/0030234 | A1 * | 10/2001 | Wiklof | 235/383 |
| 2001/0049677 | A1 * | 12/2001 | Talib et al. | 707/3 |
| 2002/0035611 | A1 * | 3/2002 | Dooley | 709/218 |
| 2002/0078016 | A1 * | 6/2002 | Lium et al. | 707/1 |
| 2002/0193986 | A1 * | 12/2002 | Schirris | 704/8 |
| 2006/0123361 | A1 * | 6/2006 | Sorin et al. | 715/854 |
| 2006/0152504 | A1 * | 7/2006 | Levy | 345/419 |
| 2008/0033917 | A1 * | 2/2008 | Jones et al. | 707/3 |

OTHER PUBLICATIONS

Google Inc., Reviewer's Guide: Google Toolbar 4, Jul. 2006, Google Inc., p. 5.*
Miller, GooglePedia: The Ultimate Google Resource, Jul. 11, 2006, Que, 1st Edition, Chapter 2, Appendix C.*

(Continued)

*Primary Examiner* — Rehana Perveen
*Assistant Examiner* — Huen Wong
(74) *Attorney, Agent, or Firm* — Brinks Gilson and Lione (57) ABSTRACT

A method for processing structured search queries received at an internet search includes receiving at the internet search site a structured search query containing a user's search intent and other pertinent information about the user and the site. The structured search query is constructed as a conforming structured search string. The method further includes parsing the structured search query based on a grammar published for affiliates or partners to construct the structured search query. Still further, the method includes extracting individual breadcrumbs from the structured search query that were used to build the structured search query. This includes decoding the position and meaning of each respective breadcrumb in the structured search query. The method further includes forming match tokens from the identified individual breadcrumbs and combinations of breadcrumbs. Still further the method includes matching listings stored in a search listing database with the formed match token strings, forming a search result list, and ranking elements of the search result list according to strength of match tokens to the original user search intent.

20 Claims, 5 Drawing Sheets

(56) References Cited

OTHER PUBLICATIONS

Long, Google Hacking for Penetration Testers, Jul. 2004, Syngress, Sec. 1.1-1.7, 2.1-2.7.*
Introduction to Web Databases, located at http:/askscott.com/sec1.html, 3 pages.
Using a Search Engine, located at http:/askscott.com/sec2.html, 5 pages.
Using a Pick List, located at http:/askscott.com/sec3.html, 2 pages.
Selecting the Proper Web Database, located at http:/askscott.com/sec4.html, 2 pages.

* cited by examiner

STRUCTURED MATCH IN A DIRECTORY SPONSORED SEARCH SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to internet searching and, more particularly, to a method and apparatus for structured match in an online search system.

Since its inception, the Internet has provided a useful tool for searching for information, products or services. The Internet has also provided a means for enabling the purchase of goods and services, and providing advertisements to a vast population of Internet users. As the access to and the use of the Internet has continued to increase, new uses for the Internet have continued to evolve.

One form of advertising has been to allow vendors to bid for a particular position in a search result. That is, an advertiser is ranked according to the cost per click ("CPC") for each search term. The CPC is the amount the advertiser will pay if a user "clicks through" on the listing. Vendors will be positioned in a search result depending upon their various bids, and will pay the amount of their respective bids in response to a click through by a user. The user enters a search query in a search box presented on a web page and receives search results on a subsequent web page. A user click through on a search result listing redirects the user's web browser to the uniform resource locator (URL) associated with the search listing.

Such a system may be referred to as a pay for placement advertising system and is operated by a web search provider. A searcher accessing the pay for placement site is presented with a search box and the opportunity to enter one or more keywords for searching. Search results are returned based on a search algorithm. The search results are ordered at least in part using the respective bids entered by vendors associated with the respective search listings.

In another form of internet advertising, advertisers have their web sites organized in the form of a hierarchical directory structure. One example of such a hierarchical advertising arrangement is a shopping site, in which goods and services are organized in broad categories. Under each category of a hierarchical directory are sub-categories and sub-sub-categories, and so on, forming a hierarchical tree. Any product offered on a shopping site can be thus categorized in the directory tree, even to include a brand name for the product and a manufacturer's model or device identifier. More generally, any item or entry in such a hierarchical directory structure has a unique location in the structure.

Such hierarchical sites may operate in conjunction with a pay for placement system. In such a case, when a user searches for information on a hierarchical site by entering a keyword, a query is sent to a searching apparatus. All entries in the hierarchical directory which form a match are returned and may be organized as search results. The search results are then presented to the user.

Directory or hierarchical advertising sites and pay for placement sites are both forms of sponsored search. Advertisers sponsor search listings which are searched for matching entries upon receipt of a keyword from a searcher. These sites have been commercially successful. However, a particular problem experienced when operating a sponsored search site is to provide effective sponsored search listings (advertisements) when a user is either navigating through a site or enters a search query in the search box within such a site.

The query about contents of a hierarchical directory to the search apparatus may be referred to as a breadcrumb query. The query contains contextual path information identifying a location in the directory. An example of a breadcrumb is as follows:
Parent category->Category->Sub-Category->Product->Attribute->etc.

In the case of a shopping web site organized as a hierarchical directory, an example breadcrumb is as follows:
Sports and Outdoors>Sport and Outdoor>Cheap Baseball Gloves>price range $100-$150

In these examples, the symbols -> are arbitrarily chosen to serve as delimiters. The words and phrases between the delimiters are individual breadcrumbs and refer to categories and sub-categories within the hierarchical directory system.

When a user navigates through any structured information site, there is no defined method or protocol for that site to provide the rich information contained in the user's action while requesting sponsored search results. When sending a query to a searching apparatus, generally, a directory site has only two options, either to send the entire breadcrumb or to send just the last node in the directory. Empirically, when only the last node or leaf node is sent to the searching apparatus, the originating directory search system experiences poor match relevance. That is, the content of the returned search results are not closely related to the searcher's interest. The result is a relatively poor click through rate, meaning that the percentage of searchers actually clicking on a returned search listing is relatively small. Further, when the entire breadcrumb is sent to the searching apparatus, poor coverage has often been the result. That is, the searching apparatus can provide search results for only a relatively small fraction of received searches which include an entire breadcrumb.

Accordingly, there is a need for an improved system and method for processing search queries from hierarchical directory sites.

BRIEF SUMMARY

By way of introduction only, one present embodiment provides a method for processing structured search queries received at an internet search includes receiving at the internet search site a structured search query containing a user's search intent and other pertinent information about the user and the site. The structured search query is constructed as a conforming structured search string. The method further includes parsing the structured search query based on a grammar published for affiliates or partners to construct the structured search query. Still further, the method includes extracting individual breadcrumbs from the structured search query that were used to build the structured search query. This includes decoding the position and meaning of each respective breadcrumb in the structured search query. The method further includes forming match tokens from the identified individual breadcrumbs and combinations of breadcrumbs. Still further the method includes matching listings stored in a search listing database with the formed match token strings, forming a search result list, and ranking elements of the search result list according to strength of match tokens to the original user search intent.

In another embodiment, a method for processing search queries received at a database search system includes receiving a breadcrumb search query and identifying individual breadcrumbs in the breadcrumb search query. Further the method includes forming breadcrumb search strings from the identified individual breadcrumbs. The method also includes identifying as matching search listings those search listings of a database which have a predetermined matching relationship with the breadcrumb search strings. Also, the method includes formatting a search result list using the matching search listing.

In one example, a user searching for information about antitrust law navigates through a hierarchical directory site by clicking individually on Directory>Government>Law>Business>Antitrust>Cases. After the click though, the search system receives an entire breadcrumb query in the form "Directory>Government>Law>Business>Antitrust>Cases". The search system matches using the following sub-queries: "Antitrust Cases", "Cases" and "Antitrust." The search system then serves the listings obtained by matching these sub-queries individually and then ordering them in a search result list.

In other examples, shopping directories serve as business partners for the search system. A first use case involves navigation based queries. In such as query, a user navigates down the shopping site hierarchy, moving from general categories to specific products. An example query is Electronics>Cameras and Photography>Digital Cameras>Sony>At Least 6× Zoom 6.0+ Megapixels. The search system receives this query and eliminates attributes such as "At Least 6× Zoom" and "6.0+ Megapixels". Sub-queries are formed, such as "Digital Cameras Sony", "Sony" and "Digital Cameras." The search system serves up the listings obtained by matching these sub queries individually and then ordering them as search results. The search system records the individual breadcrumb query and the bidded term that was served, along with the click and revenue information. Since higher categories are highly commercial terms such as "Digital Cameras" and "Sony", the search system may provide close to 100% coverage for these terms.

A second use case involves user entered queries. The user enters "Digital Camera Reviews" on in search box and clicks through on a link to a shopping site. The shopping site sends the user query concatenated with "context" breadcrumb, such as "Electronics>Cameras and Photography>Digital Cameras>Digital Camera Reviews" to the search system. The search system uses "Digital Camera Reviews" and "Digital Camera" as sub-queries. The search system serves the listings obtained by matching these sub queries individually and then ordering them. The search system records the individual breadcrumb query and the bidded term that was served, along with the click and revenue information which will be used for subsequent optimizations.

The foregoing discussion of exemplary embodiments has been provided only by way of introduction. Nothing in this section should be taken as a limitation of the following claims, which define the scope of the invention.

DETAILED DESCRIPTION OF THE DRAWINGS AND THE PRESENTLY PREFERRED EMBODIMENTS

Figure 1:
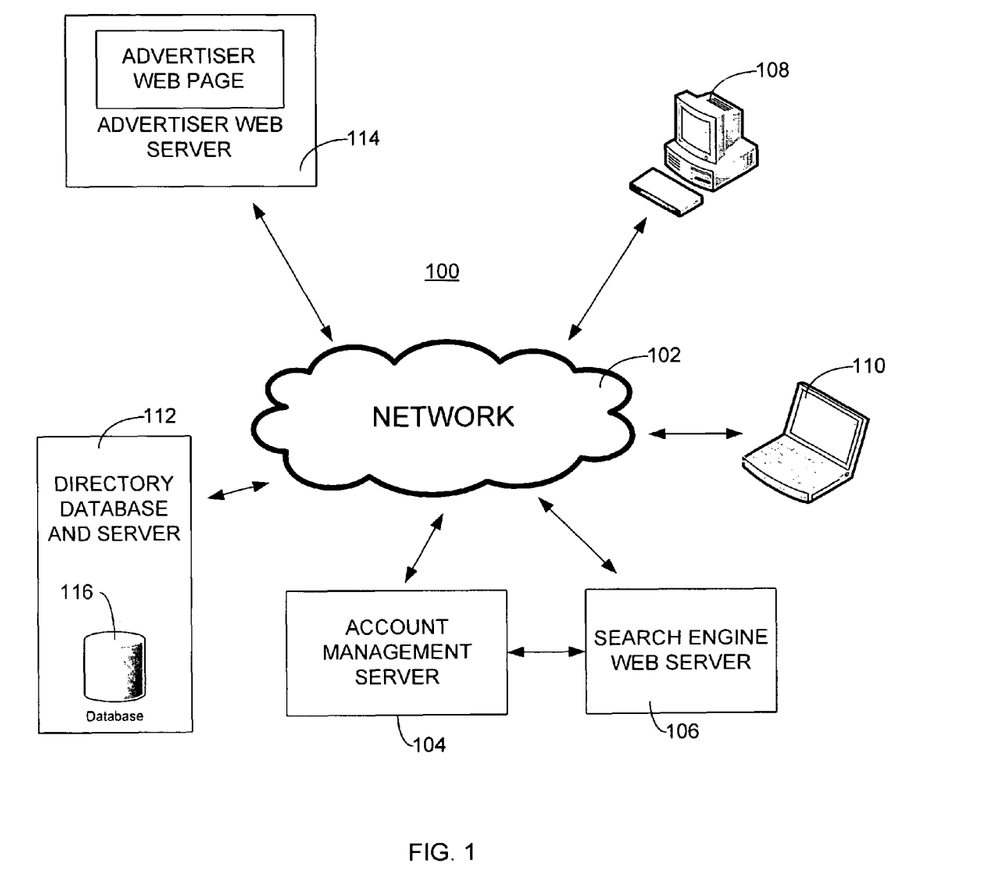
FIG. 1 is a block diagram of a database access system employing a method for generating a search result list according to the present invention.

Turning first to FIG. 1, a block diagram of a database access system 100 employing the method for generating a search result list according to the present invention is shown. In the exemplary embodiment of FIG. 1, the database access system 100 includes a network 102, an account management server 104, a search engine web server 106, a computer 108, a portable computer 110, a directory database and server 112 and an advertiser web server 114.

The network 102, such as a telecommunications network enabling access to the Internet, is coupled to a number of elements which interact to enable the method of the present invention. In particular, an account management server 104 and a search engine web server 106 implement a pay for placement or sponsored search network and enable a user to search the Internet by way of the network 102.

The account management server 104 preferably comprises a search listing database having stored therein a plurality of search listings, each search listing being associated with an information provider, at least one keyword, a money amount, and a computer network location. The account management server 104 permits an advertiser (also referred to herein as an information provider) to access and manage search listings associated with the information provider.

The search engine web server 106 includes a software application which operates as a search engine. Search queries are received over the network from searchers. The search engine web server 106, including the search engine, locate search listings in the search listing database of the account management server 104 having a predetermined matching relationship with a received search query. For example, the received search query may be a keyword and the search engine locates search listings in the database which match the keyword. The search engine web server 106 returns the matching listings as search results to the searcher. The search results may be ordered in a particular manner, such as in accordance with the money amount associated with each search listing.

Additional information related to the account management server and search engine server, as well as other features of network 102, can be found in U.S. Pat. No. 6,269,361, issued on Jul. 31, 2002 to Davis et al., the patent of which is incorporated herein by reference.

A searcher can search the Internet by way of the search engine web server 106 using a communication device, such as the computer 108, a portable computer 110, or a mobile device such as a cellular telephone, a personal digital assistant (PDA), or some other wireless communication device (not shown). Generally, the person conducting an internet search by way of a communication device will be called a user or searcher.

The directory database and server 112 stores a hierarchical directory database 116. In the directory database 116, data is organized by categories. Each category is further organized by sub-category, and each sub-category in turn is organized by sub-category. The result is a directory tree of arbitrary size, with each branch and leaf of the tree having a logical relationship to adjoining branches or leaves. Each branch or leaf may be specified by a unique directory pathname.

The directory database and server 112 further are configured for communication with the network 102 so that the contents of the directory database 116 may be accessed from remote locations and information from the directory database 116 may be conveyed to remote locations. In particular, queries involving information from the directory database 116 may be conveyed over the network 102 to the account management server 104 or search engine web server 106 for processing. For example, a query may include a portion of a directory pathname which is passed to the search engine web server 106 for matching against the contents of the search listing database of the account management server 104. Search results are returned to the directory database and server 112 or to another location in the database access system 100.

The advertiser web server 114 enables access to information of advertisers by way of a communication device employing a search engine. For example, the account management server 104 could host a website for the vendor site 116. Alternatively, an advertiser may use the advertiser web server 114 to access and update information stored in the directory database 116. An advertiser could be any vendor providing goods, services, information, etc. from a physical store or online by way of a communication network search on the Internet.

By way of example, the directory database and server 112 in one application implements a shopping website. The shopping website is accessible over the Internet by searchers seeking information about products and services. The shopping website includes a hierarchical database, as implemented by the directory database 116. The hierarchical database is organized by categories of goods and services. The directory database and server 112 further provides features such as searching, ad serving, directory access and navigation and display options. For example, several navigation options may be presented to allow a searcher to move to different categories in the database, for example, by price range, brand, rating or product feature. The directory database and server 112 thus in part implements a user interface for the shopping directory database 116.

The directory database and server 112 and the account management server 104 may be operated by one service provider as a combined sponsored search system. Shopping or other queries received at the directory database and server 112 are passed over the network 102 to the search engine web server 106. In other embodiments, the directory database and server 112 is operated by a service provider different from the search provider which operates the search engine web server 106. In such a case, the service provider who operates the directory database and server 112 may be considered a partner or affiliate of the search provider who operates the search engine web server 106.

Figure 2:
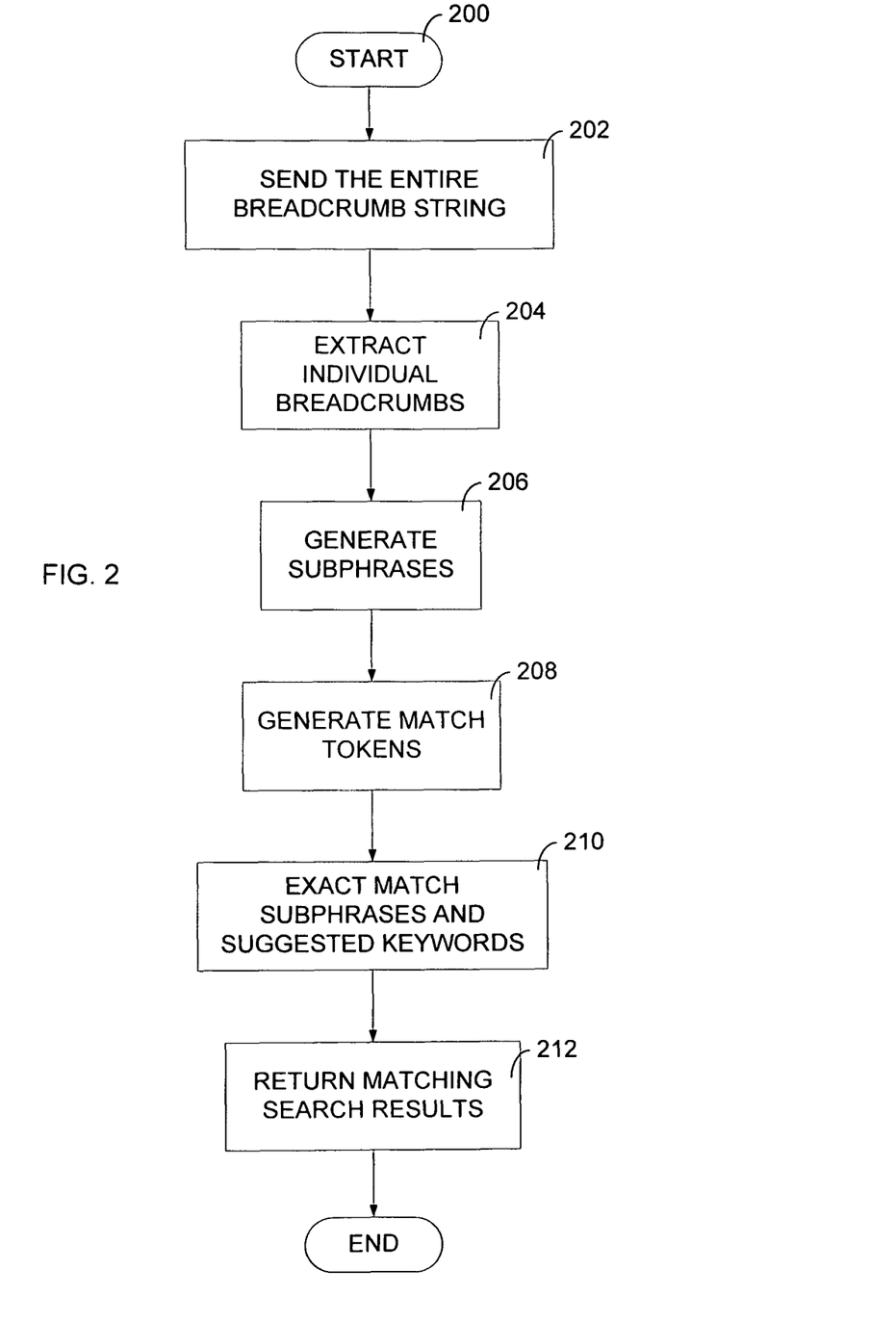
FIG. 2 is a flow diagram illustrating a structured match process for use in the database access system of FIG. 1.

The structured match process, for example, operating on the directory database and server 112, will send the entire breadcrumb query to an exact match process, for example, operating on the search engine web server 106. For the advanced match band, the structured match process will form multiple bidded search term candidates based on phrase technology and new structured match suggested keywords technology. The structured match process is illustrated in FIG. 2. The process begins at block 200.

At block 202, the directory database and server 112 sends the entire breadcrumb query string to the search engine web server 106 in the form of a request. The request in some embodiments includes the breadcrumb query and the desired number of listings to be matched and returned. The search engine web server 106 or other suitable matching process performs a match on search requests provided thereto. That is, the search engine web server 106 locates search listings in the search engine database which have a matching relation with submitted search terms. Before matching, the request is preprocessed as will be described below.

First, at block 204, the process extracts individual breadcrumbs BC1 and BC2 from the breadcrumb query, where BC1 and BC2 are not noise crumbs as defined in greater detail below. The individual breadcrumbs will be pipe delimited within the breadcrumb query, where the character | is referred to as a pipe. The breadcrumb query may contain an additional string after the final breadcrumb. The match process then proceeds to build match tokens subphrases as defined by control information. One example of this format is 'brand bc2 bc1', where brand is any brand information found anywhere in the query, bc1 is the second rightmost breadcrumb and bc2 is the next to rightmost non-noisy breadcrumb in the received breadcrumb query. Using the canonical form of the extracted breadcrumbs, sub-phrases are generated for possible matching, block 206. The generated sub-phrases in this context are referred to as match tokens.

Second, at block 208, suggested structured match keywords are generated from the received breadcrumb query string. Example suggested keywords are of the form bc2, bc1, bc0, brand bc2, brand bc1, brand bc0. Any keyword suggestion technique may be used. The suggested keywords in this context are referred to as match tokens At block 210, the process matches the match tokens generated from the breadcrumb string provided to the search engine web server 106. The search engine web server 106 locates search listings matching the tokens generated. Matches for all search terms will be retrieved, sorted by money amount or on another basis, and returned to the directory database and server 112 at block 212.

In an alternative embodiment, brand information may be added to the extracted breadcrumbs before submitting the search for exact matching. Brand information may exist anywhere in the breadcrumb query, sent from the directory database and server 112 by the partner or sent in the additional information with the query.

Figure 3:
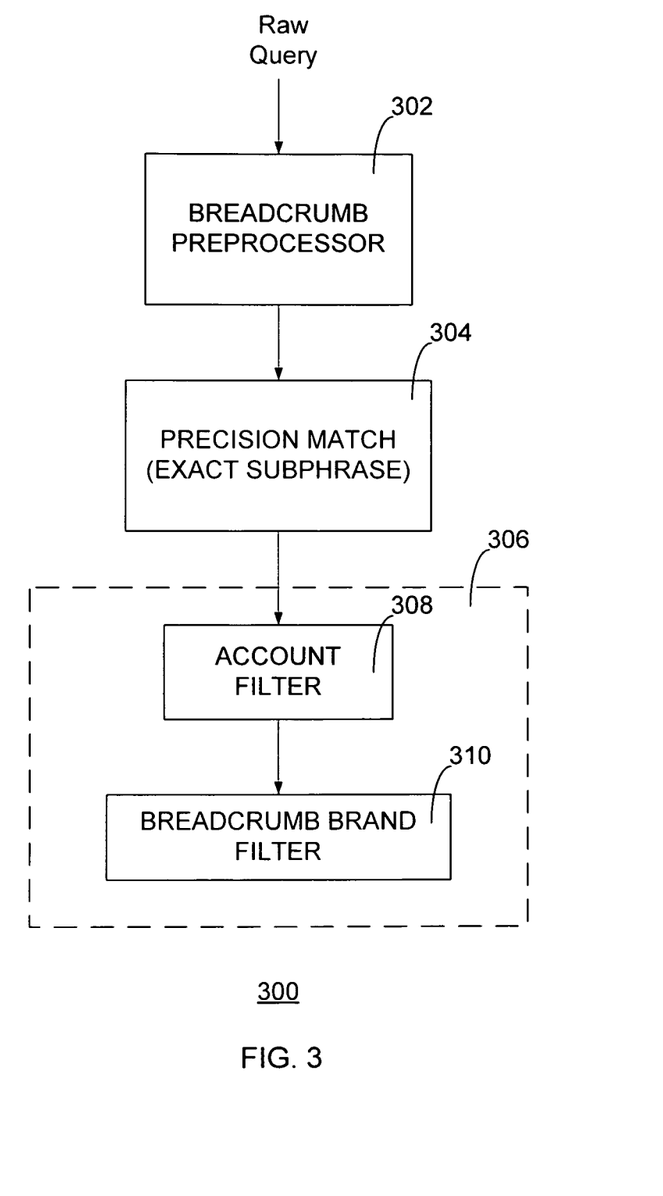
FIG. 3 is a block diagram of a structured match architecture.

FIG. 3 is a block diagram of a structured match architecture 300. The architecture 300 includes a breadcrumb preprocessor 302, a precision match module 304 and a result filter 306. The preprocessor receives an input query and processes the query. The processed query is provided to the precision match module 304 and search results matching the processed query are provided as an output. The search results are then processed in the result filter 306. The architecture 300 may be implemented in any suitable format or combination of hardware or software. In one example, the architecture 300 is implemented in the search engine web server 106 of FIG. 1.

The preprocessor 302 and the result filter 306 are added exclusively for bread crumb queries. The rest of the functional blocks are similar to other matching algorithms in a precision match or exact match framework. A precision match or exact match framework provides search results which have an exact or very close match with a keyword, where the keyword is a phrase or sub-phrase provided to a search engine. Thus, the precision match module 304 preferably includes a search engine with access to a search listing database.

The architecture 300 operates on received queries. A query is received from an outside source. In the example of FIG. 1, a query originates at the directory and database, server 112. The query may be generated, for example, in response to a search query provided by a searcher accessing the directory and database server 112. In response to the received query, the directory and database server 112 conveys the query to the search engine web server 106 of FIG. 1.

The received query from a hierarchical directory database site is referred to herein as a breadcrumb query. A breadcrumb query is an automatically generated structured search query, which describes the navigational path taken by a user to arrive at a given point on the hierarchical directory database site. Examples include the following:

Electronics | Cameras | Digital Cameras | Sony | sony powershot digital cameras

The input query will be of the form
Grandgrandparent_bc <delimiter> grandparent_bc <delimiter> parent_bc <delimiter> submitted_keyword <delimiter> additional_info In this general syntax, "bc" refers to an individual breadcrumb. A breadcrumb is a string within a breadcrumb query, bounded by delimiters. In the first example above, "Electronics", "Cameras", "Digital Cameras" and "Sony" are all breadcrumbs, delimited by "|". This may also be also described more generally as bc4 <delimiter> bc3 <delimiter> bc2 <delimiter> bc1 <delimiter> bc0

In this example, BC0 is the rightmost breadcrumb in the breadcrumb query. Also BC0 may also be called 'additional information' received from a partner. BC1 is the second rightmost breadcrumb, possibly noisy, in the query. It may also be called 'submitted keyword' or 'search term'. BC2 is the next to rightmost non-noisy breadcrumb. It may also be called 'category'. BC21 is the concatenation of BC2 and BC1.

If some field is not present then it may be left empty, as in the following examples:

1. Electronics | tv and video | flat panel televisions | dell | flat panel tv
2. ||| day bed saigon | day bed saigon ++ buy furniture In the second example, several breadcrumb fields are empty.

Additional data needed for processing the query in the breadcrumb preprocessor 302 include a list of brands for the market and a list of noise words/phrases and regular expressions (regexp) used to clean or process the received queries. These data files may be populated and maintained by the operator of the search engine web server 106.

Further, a set of parameters is provided in the search engine web server 106 for use by the preprocessor 302. The file in one example is called BreadCrumbParams. The contents of the file BreadCrumbParams include:

1. a delimiter used to demarcate breadcrumbs in the query
2. the form the match tokens should take. Typical choices include
   a. brand bc2 bc1
   b. brand bc1 bc2
   c. bc2 bc1

The result filter 306 includes an account filter 308 and a breadcrumb brand filter 310. The account filter 308 processes account-specific information and removes some search results based on the account-specific information. The breadcrumb brand filter 310 removes from the search results some search listings according to predetermined rules. For example, if the results in the sub-phrase match a brand name alone, then those results are excluded because of their ambiguity. The brand information may be obtained from the breadcrumb preprocessor 302.

Figure 4:
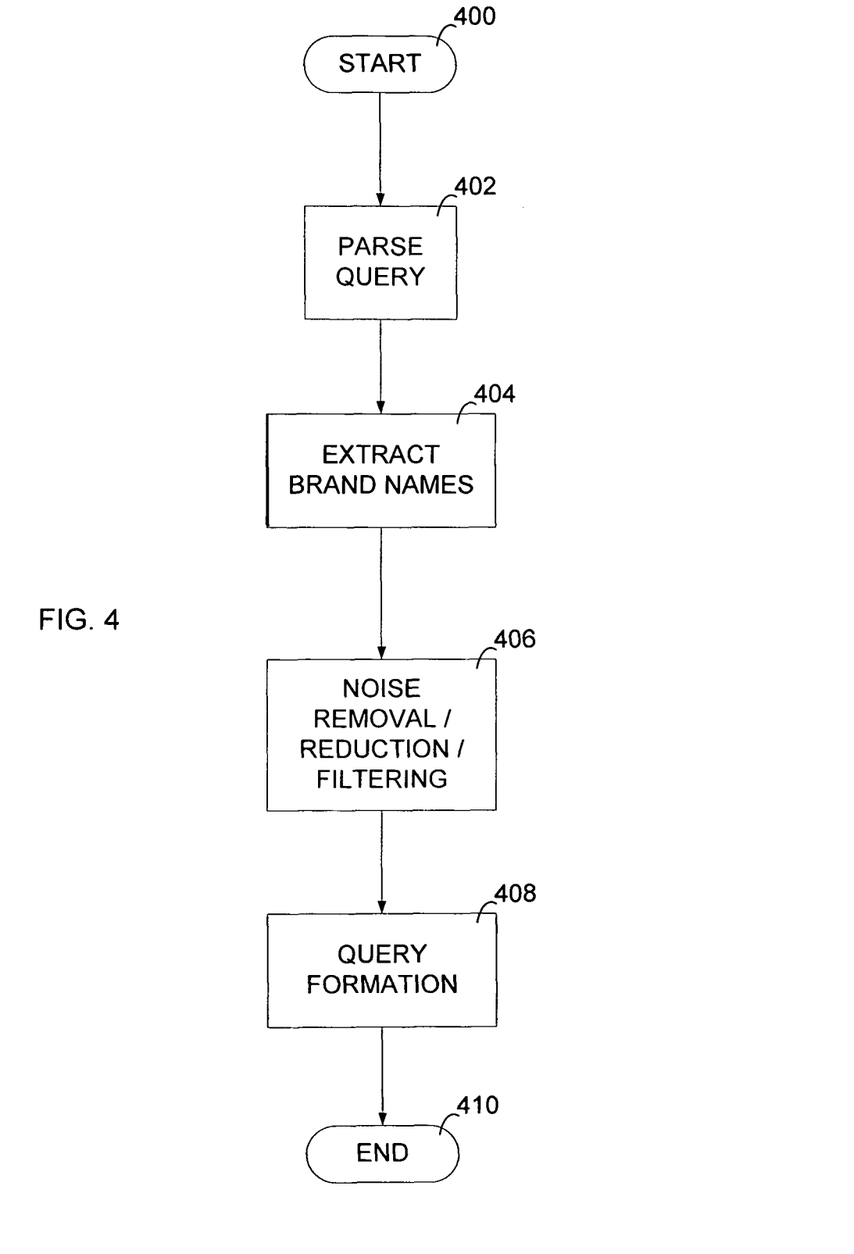
FIG. 4 is a flow diagram illustrating operation of the breadcrumb preprocessor of FIG. 3.

FIG. 4 is a flow diagram illustrating a method of operation of the breadcrumb preprocessor 302 of FIG. 3. The method begins at block 400. At block 402, the received raw query is parsed to determine its content and format. A received query is parsed to extract information contained in the query. Examples of the information being extracted include (1) a submitted_keyword, (2) a category, and (3) any additional information contained in the query. The following parsing algorithm may be used:

(a) additional information is the right-most breadcrumb (possibly empty).
(b) the submitted_keyword is the second right most breadcrumb (possibly empty).
(c) look for a brand anywhere in the query;
(d) category is the right-most non-noisy breadcrumb which is not a submitted keyword or additional_info or brand (possibly empty). Identification of noise and noisy breadcrumbs is discussed in greater detail below.
(e) set some parameters for the preprocessing portion (interpreting parameters from the received query). An example is the query formation rules described below.

The following breadcrumb query examples illustrate how various breadcrumb queries may be parsed by the breadcrumb preprocessor 302 using the parsing algorithm above.

Example 1

Electronics | tv and video | flat panel televisions | dell | flat panel tv | 27 in television
   The terms found are:
   a. submitted_keyword="flat panel tv"
   b. category="flat panel televisions"
   c. additional_info="27 in television"
   d. brand=Dell
Since Dell is a brand it is not used as a 'category'.

Example 2 computers | pdas and portable hardware | pdas under | price range 300 400 | 1945 | pda ++ personal organizers ++ ipaq_h1945

Notice that the category found is the first non-noisy breadcrumb to the left of submitted keyword that is not a brand. The terms found are:
   a. submitted_keyword="1945"
   b. category="pdas"
   c. additional_info="pda", "personal organizers", "ipaq h1945"
   d. brand=ipaq At block 404, brand names contained in the query are extracted. For a given breadcrumb, brands will be identified and extracted from the text. Any suitable technique for identifying brands may be used. In one exemplary embodiment, the breadcrumb preprocessor 302 accesses a breadcrumb brands file to look up the brands from a brands list. Such a list and file are provided for each market. Markets may be defined in any suitable manner, such as "home electronics," "photography," "automotive," etc. Some sample brand names include the following:

Sony, canon, nike, ray-ban, rayban ray ban etc.

In one example, each term identified in the parsed query is compared to the elements of the brands list. If the term matches, it is extracted as a brand. Further, the received brands list and query may be canonicalized, for example, to remove upper and lower case letters, to remove plurals and common endings and so forth.

At block 406, noise is removed or reduced from the query. Noise crumbs are those breadcrumbs in the query which are irrelevant for matching purposes. For examples, in the query Clothing | Shirts and Tops | Below $15 | Men "Below $15" and "Men" are noise crumbs.

Noise comes in many forms and noise removal may be handled in two ways. First, noise is removed by looking for noise patterns (regular expressions). Second, noise is removed by looking for noise words or phrases in the crumbs. Both these noise removal techniques are accomplished by any suitable method.

In one example, noise words are broken down into three categories, hard noise, soft noise and isolated noise. The types of noise words are processed as described below.

hard noise=>If this noise word(s) is/are present in the crumb, then the whole crumb will be dropped. Examples:

(1) words like 'height', 'weight', 'female', 'male', 'price', etc.

(2) the query clothing | sweaters | female | low price deals| liz clairborne sweaters| will result in the following:

category=sweaters; brand=liz clairborne; submitted_key=liz clairborne sweaters.

Here, the hard noise crumb 'female' is discarded. So is the crumb 'low price deals' even though only one word 'price' is hard noise. In this embodiment, if any noise term is found in an individual breadcrumb, then the whole breadcrumb is discarded from consideration.

soft noise=>If this noise word(s) is/are present in the crumb, then the noise word will be removed. That is, the breadcrumb will be used without this word, in contrast to the hard noise, in which the whole breadcrumb is discarded. Examples of soft noise include words like 'reviews', 'discount', 'sale', etc.

Thus, in the query

|electronics| digital camera reviews| sony| will result in the following:

category=digital camera brand=submitted_keyword=sony

Notice that the soft noise word 'review' was merely removed and the crumb itself is used as a category. This is different from the hard noise case where the whole breadcrumb is discarded even if one word is hard noise.

isolated noise=>If this word is a breadcrumb by itself, then the breadcrumb is dropped from consideration. The word(s) will appear isolated. That is, no other words will be present in the crumb. Examples include words describing color, shape, etc when occur by themselves as a breadcrumb should be dropped. In the query Flowers | pink | roses |

'pink' is noisy and discarded, whereas in the query clothing | dresses | pink dresses |

'pink' is NOT noisy since it appears along with another word. In hard noise; even if the noise word appears in conjunction with other words, the whole breadcrumb is dropped. Here, in the case of isolated noise, the breadcrumb is discarded only if the noise word appears by itself as a breadcrumb. Similar noise words include leather, copper, khaki, accessory, king (when referring to bed type), imports (when referring to music) etc.

At block 408, in preprocessing a breadcrumb query, a query is formed that may be passed to the search engine for matching with search listings in the search listing database. Given the parsed terms or individual breadcrumbs identified in the raw query received by the preprocessor 302, various rules are used to form queries. The forms queries are specified in information provided to the search engine web server 106.

Figure 5:
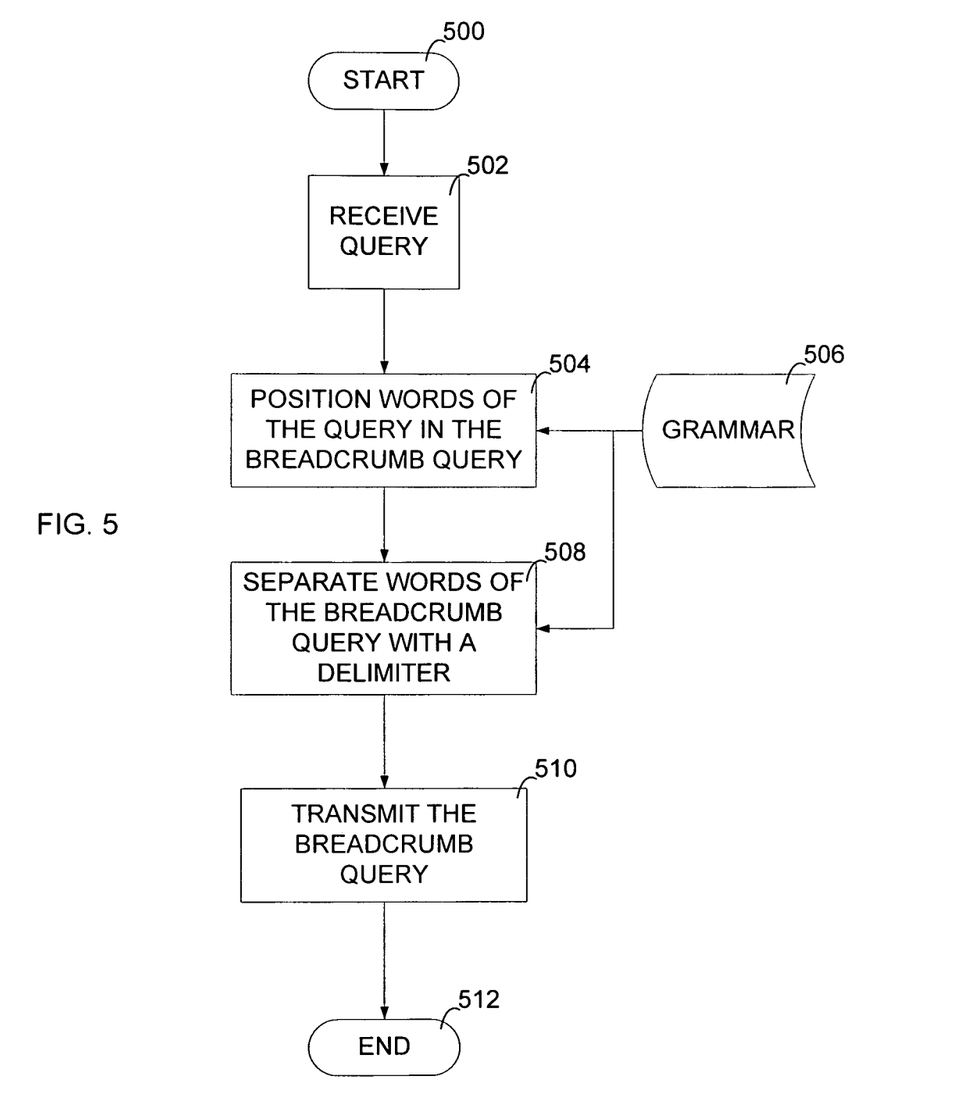
FIG. 5 is a flow diagram illustrating formation of a breadcrumb query.

FIG. 5 is a flow diagram illustrating formation of a breadcrumb query. The illustrated method may be performed, for example, at a site such as the directory database and server which receives a user's search query and sends a breadcrumb query to an internet search site such as the search engine web server 106 of FIG. 1. The method begins at block 500.

At block 502, a search query for the directory database is received. The search query may be entered by a user or searcher, for example, by typing a word or phrase into a search box of a web page.

At block 504, formation of the breadcrumb query begins. Words of the search query are positioned according to a grammar 506. The grammar 506 is specified by the operator of the internet search site. Use of the grammar 506 allows the internet search site to accurately parse the breadcrumb query upon its receipt at the internet search site. The grammar 506 may be a file or data containing rules or other information defining how a query is to be formed. The grammar 506 may be provided to the operator of the directory database by the operator of the internet search site. In accordance with one embodiment, the breadcrumb query may be formatted as follows:

BC4|BC3|BC2|BC1|BC0<optional string> where BC0, BC1, BC2BC3 and BC4 are words or word combinations detected in the user-entered query. For some user queries, some portions such as BC0 <optional string> are not always present.

At block 508, the individual breadcrumbs are pipe delimited within the breadcrumb query. The character | is referred to as a pipe and may be used to delimit or separate the individual breadcrumbs. Any other character may be chosen as a delimiter and specified as such in the grammar. Again, the grammar 506 defines rules for positioning and delimiting the respective breadcrumbs.

Other rules may be applied as well. For example, if breadcrumb BC1 is not sent, the breadcrumb query will be formatted as follows:

BC4|BC3|BC2||<optional string>

In this example, BC1 is considered empty.

Other information may be provided as well. This information may be contextual information or hints which may be specified in the breadcrumb query.

At block 510, the breadcrumb query is communicated to the internet search site. In some applications, the query is transmitted as a partner request which includes other information. Also, the request may include the breadcrumb query and the desired number of listings which are to be returned as search results from the internet search site.

Upon receipt of the breadcrumb query at the internet search site, the breadcrumb query is parsed according to the grammar, for example, in accordance with the method described in conjunction with FIG. 4. After parsing the breadcrumb query, one or more exact match search queries are formatted for submission to the search engine.

From the foregoing, it can be seen that the present embodiments provide method and apparatus for processing a structured search query received at an internet search system. The structured search query originates from a directory or hierarchical database site such as a shopping site on the internet. Instead of just sending one keyword query per user action, the site assembles the structured breadcrumb queries in the format requested by the search system. This breadcrumb query information is sent to via an affiliate feed interface. The feed or request for ad listing(s) is configured to extract the entire breadcrumb query being sent to the search system. The breadcrumb query is then parsed by backend matching technology and several keywords are extracted from it and organized by their relative relevance to the user's action. The listings are assembled from the various keywords that are extracted and ranked in an optimal fashion and returned to the requesting site.

It is therefore intended that the foregoing detailed description be regarded as illustrative rather than limiting, and that it be understood that it is the following claims, including all equivalents, that are intended to define the spirit and scope of this invention.

The invention claimed is:

1. A method for processing structured search queries received at an internet search site from a business partner site operated by a business partner of an operator of the internet search site, the method comprising:
    receiving at the internet search site a structured search query from the business partner site, the structured search query containing an original user's search intent, the business partner site including a hierarchical database, the hierarchical database being organized as a plurality of categories and subcategories within respective categories, the business partner site having an agreement with the internet search site to provide search queries and receive search results from the internet search site, the structured search query being constructed as a breadcrumb search including a plurality of breadcrumbs, each respective breadcrumb within the structured search query having a text string reflecting a respective category or subcategory of the hierarchical database to define contextual path information identifying a location in the directory database;
    parsing the structured search query based on a grammar published for business partners to construct the structured search query;
    extracting individual breadcrumbs from the structured search query that were used to build the structured search query, including decoding of position and meaning of each respective breadcrumb in the structured search query;
    creating sub-phrases from canonical forms of the extracted individual breadcrumbs and from combinations of the extracted individual breadcrumbs;
    forming match tokens from sub-phrases;
    matching listings stored in a search listing database of the internet search site with the formed match tokens;
    forming a search result list with the matched listings; and
    ranking elements of the search result list according to strength of match tokens to the original user search intent.

2. The method of claim 1 further comprising:
    after extracting the individual breadcrumbs, identifying noise crumbs or non-consequential substrings among the individual breadcrumbs; and
    selectively removing the noise crumbs and the non-consequential substrings before forming the match tokens.

3. The method of claim 2 further comprising:
    receiving a list of noise words for the business partner site; and
    breaking down the noise words into hard noise words, soft noise words and isolated noise words.

4. The method of claim 3 further comprising:
    removing individual breadcrumbs that contain hard noise words.

5. The method of claim 3 further comprising:
    removing portions of an individual breadcrumb that contains soft noise words while retaining the rest of the individual breadcrumb.

6. The method of claim 3 further comprising:
    removing entire breadcrumbs that contain isolated noise.

7. The method of claim 1 further comprising:
    defining a grammar for constructing and referring breadcrumb search strings from the extracted individual breadcrumbs.

8. The method of claim 7 wherein defining the grammar comprises:
    specifying construction of a breadcrumb query including positioning of a user entered search string via a specified delimiter;
    specifying positioning in the breadcrumb query of other contextual information; and
    specifying construction of hints, if any are available, and delimited breadcrumb representations for the hints.

9. The method of claim 8 wherein specifying positioning of other contextual information comprises:
    specifying a directory path associated with a product page in a directory hierarchy, identified by a specified delimiter.

10. A method for processing search queries from a directory database and server including a hierarchical database received at a database search system, the method including:
    receiving at the database search system a breadcrumb search query originating in the directory database and server, the hierarchical database of the directory database and server being organized as a plurality of categories and subcategories within respective categories, the breadcrumb search query including a plurality of breadcrumbs, each respective breadcrumb within the breadcrumb search query having a text string reflecting a respective category or subcategory of the hierarchical database to define contextual path information identifying a location in the directory database;
    identifying individual breadcrumbs in the breadcrumb search query;
    extracting the identified individual breadcrumbs from the breadcrumb search query;
    forming breadcrumb search strings from combinations of the extracted, identified individual breadcrumbs combining the extracted, identified individual breadcrumbs;
    identifying as matching search listings those search listings of a database which have a predetermined matching relationship with any one of the breadcrumb search strings; and
    formatting a search result list using the matching search listings.

11. The method of claim 10 further comprising:
    after identifying the individual breadcrumbs, identifying brands before forming the breadcrumb search strings.

12. The method of claim 10 further comprising:
    after identifying the individual breadcrumbs, identifying noise among the individual breadcrumbs; and
    removing noise before forming the breadcrumb search strings.

13. The method of claim 12 further comprising:
    receiving a list of noise words;
    comparing the individual breadcrumbs with the list of noise words; and
    if an individual breadcrumb matches a noise word on the list of noise words, removing the noise-matching individual breadcrumb from the individual breadcrumbs.

14. The method of claim 12 further comprising:
    receiving a list of noise words;
    comparing the individual breadcrumbs with the list of noise words; and
    if a noise word from the list of noise words is contained in an individual breadcrumb, removing the noise word from the breadcrumb.

15. The method of claim 12 further comprising:
receiving a list of noise words;
comparing the individual breadcrumbs with hard noise words on the list of noise words; and
if an individual breadcrumb matches a hard noise word on the list of noise words, discarding the individual breadcrumb.

16. The method of claim 10 wherein forming breadcrumb search strings from the identified individual breadcrumbs comprises:
forming match tokens based on pre-determined rule sets.

17. The method of claim 10 wherein forming breadcrumb search strings from the identified individual breadcrumbs comprises:
forming various match tokens using proximity, ordering and other relevant information of individual breadcrumb strings.

18. A method for constructing a breadcrumb query for transmission to an internet search system, the method comprising:
at a server, receiving a user entered search string for a directory database, the directory database having a hierarchical organization with a plurality of categories and subcategories within respective categories;
at the server, positioning individual words of the received search string as breadcrumbs in a breadcrumb query according to a predefined grammar which defines rules for positioning and delimiting the breadcrumbs in the breadcrumb query, each respective breadcrumb of the breadcrumb query having a text string reflecting a user-recognizable respective category or subcategory of the directory database to define contextual path information identifying a location in the directory database;
at the server, separating respective individual breadcrumbs in the breadcrumb query with a delimiter according to the grammar, the delimiter represented by [[an]] a non-space ASCII character defined by the grammar, the ASCII character serving to separate respective breadcrumbs; and
at the server, communicating the breadcrumb query to the internet search system.

19. The method of claim 18 further comprising:
positioning additional information or hints in the breadcrumb query according to the grammar.

20. The method of claim 18 wherein positioning individual words of the received search string as breadcrumbs in a breadcrumb query comprises:
identifying a canonical form of each respective breadcrumb;
positioning the canonical forms of the respective breadcrumbs in the breadcrumb query; and
further positioning combinations of the canonical forms of the respective breadcrumbs in the breadcrumb query.

* * * * *